United States Patent [19]
Kohli et al.

[11] Patent Number: 5,741,746
[45] Date of Patent: Apr. 21, 1998

[54] GLASSES FOR DISPLAY PANELS

[76] Inventors: Jeffrey T. Kohli, 25 Spencer Hill Rd.; Dawne M. Moffatt, 1 Evergreen Dr., both of Corning, N.Y. 14830

[21] Appl. No.: 593,097

[22] Filed: Feb. 14, 1996

Related U.S. Application Data

[63] Continuation-in-part of Ser. No. 397,606, Mar. 2, 1995, abandoned.

[51] Int. Cl.$^6$ ..................................................... C03C 3/087
[52] U.S. Cl. .......................... 501/70; 501/65; 501/66; 501/69
[58] Field of Search .................................. 501/65, 66, 69, 501/70

[56] References Cited

U.S. PATENT DOCUMENTS

| | | | |
|---|---|---|---|
| 3,563,772 | 2/1971 | Joorman et al. | 501/66 |
| 3,927,238 | 12/1975 | DiMarcello | 501/21 |
| 3,942,992 | 3/1976 | Flannery | 501/70 |
| 3,978,362 | 8/1976 | Dumbaugh, Jr. et al. | 501/70 |
| 4,012,263 | 3/1977 | Shell | 501/70 |
| 4,060,423 | 11/1977 | Thomas | 501/70 |
| 4,198,585 | 4/1980 | Yamashita et al. | 313/218 |
| 4,255,198 | 3/1981 | Danielson et al. | 501/70 |
| 4,607,016 | 8/1986 | Danielson et al. | 501/70 |
| 4,634,634 | 1/1987 | Kondo et al. | 428/432 |
| 4,693,987 | 9/1987 | Danielson | 501/70 |
| 4,737,685 | 4/1988 | Thomas | 313/579 |
| 4,746,578 | 5/1988 | Kondo et al. | 428/432 |
| 4,824,808 | 4/1989 | Dumbaugh, Jr. | 501/66 |
| 5,116,788 | 5/1992 | Dumbaugh, Jr. | 501/66 |
| 5,116,789 | 5/1992 | Dumbaugh, Jr. et al. | 501/66 |
| 5,209,688 | 5/1993 | Nishigaki et al. | 445/24 |
| 5,221,979 | 6/1993 | Kim | 359/54 |
| 5,225,732 | 7/1993 | Watanabe et al. | 313/582 |
| 5,348,916 | 9/1994 | Kushitani et al. | 501/66 |
| 5,459,109 | 10/1995 | Lapp | 501/66 |
| 5,489,558 | 2/1996 | Moffatt et al. | 501/69 |
| 5,508,237 | 4/1996 | Moffatt et al. | 501/69 |
| 5,559,060 | 9/1996 | Dumbaugh, Jr. et al. | 501/66 |

*Primary Examiner*—Mark L. Bell
*Assistant Examiner*—Louis M. Troilo
*Attorney, Agent, or Firm*—Robert L. Carlson

[57] ABSTRACT

An aluminosilicate glass having a composition comprising, as calculated in weight percent on an oxide basis, of 40–57% $SiO_2$, 2.0–11% $Al_2O_3$, 1–16% CaO, 8–21.5% SrO, 14–31.5% BaO, 0–3% MgO, and 0–4% $B_2O_3$, the glass having a temperature not over 1450° C. at a viscosity of 20 MPa·s (200 poises), a CTE of 60–90×$10^{-7}$/° C. and a strain point over 630° C.

23 Claims, 1 Drawing Sheet

GLASSES FOR DISPLAY PANELS

This application is a Continuation-In-Part of U.S. patent application Ser. No. 08/397,606, filed Mar. 2, 1995, titled "PLASMA DISPLAY PANEL" now abandoned.

FIELD OF THE INVENTION

A plasma display device having an aluminosilicate glass panel exhibiting physical and chemical properties necessary for such devices.

BACKGROUND OF THE INVENTION

There is a rapidly growing interest in flat panel display devices. Thus far, commercial activity has centered on small units such as used in laptop computers. For this purpose, the liquid crystal display (LCD) device has been the dominant center of interest.

Increasing attention is being given to larger units that may be used in information and entertainment applications. LCDs tend to require critical accuracy in construction and, therefore, do not readily lend themselves to large size screens. Accordingly, as interest shifts to larger size units, attention is being directed to alternative types of display devices.

One such alternative is a plasma display device. In its simplest form, a plasma display device embodies two insulating glass substrates maintained in opposed, spaced relationship. One substrate has anode electrodes formed on its interface. The other substrate has cathode electrodes formed on its interface. Barriers are formed between the electrodes in each set to prevent cross talk.

The substrates are maintained in a fixed relationship facing each other. The electrodes are so arranged, and the substrates so aligned, that electrode segments face one another and correspond to a picture element. A rare gas, such as neon, argon, or helium is enclosed around and between the electrodes. When a voltage, which may be up to 100 V, is applied between the electrode sets, the gas undergoes a glow discharge. This is based on a principle commonly known as the neon glow discharge principle.

The light generated by this discharge is used to form the display. The electrodes may contain materials that generate the primary red, green and blue colors under influence of the discharge. In another form, fluorescent phosphors are coated on the electrodes and are affected by the discharge to produce the desired colors.

The electrodes may be applied in stripes that are perpendicular to one another. They may be printed, or may be formed by a photolithographic process. Alternatively, dots may be formed by printing, or by applying a film and processing the film by photolithographic techniques well known in that art.

Heretofore, the insulating substrates employed in emissive display devices have been sheets of soda lime glass. Soda lime glasses have been used because they provide a high coefficient of thermal expansion (CTE). A high CTE on the order of 60–90×10$^{-7}$/° C. (0°–300° C.) is required to match the expansion of glass frits used in producing electrodes and barriers in a display device.

For example, the electrodes and barriers may be applied as a paste and dried. The paste will contain a conductive component, such as a metal powder, a low melting point glass frit, and organics as a solvent and as a binder. The dried paste is fired to burn out any residual organic and to soften the glass frit to adhere to the substrate.

While soda lime glasses have the necessary high CTEs, they also have low strain points and low resistivities. Consequently, a soda lime substrate may shrink and/or undergo distortion during thermal processing. This processing includes firing the electrodes and/or sealing the substrates together. The high soda content also leads to sodium ion migration which degrades the display electronics (e.g. electrodes).

It would, therefore, be desirable to provide a glass substrate having a CTE in the 60°–90°×10$^{-7}$/° C. range and a strain point greater than 630° C. At the same time, it would be desirable to limit the use of alkalis in the substrate compositions since these ions may limit the lifetime of a display as well as lower the glass strain point. Most preferably, it would be desirable for the glass to be capable of being manufactured using the float process. It is a purpose of the present invention to provide glasses that meet these various conditions.

SUMMARY OF THE INVENTION

An aspect of the present invention is an aluminosilicate glass having a limited alkali metal ion concentration, whose composition comprises, as calculated in weight percent on an oxide basis, 40–57% SiO$_2$, 2.0–12% Al$_2$O$_3$, 1–16% CaO, 8–21.5% SrO, 14–31% BaO, 0–3% MgO and 0–4% B$_2$O$_3$, the glass having a temperature not over 1500° C., more preferably not over 1450° C., at a viscosity of 20 MPa·s (200 poise), a CTE of 60–90×10$^{-7}$/° C. and a strain point over 630° C. These glasses preferably employ a total R$_2$O content (where R=Li, Na, or K) which is less than about 5 weight percent.

A further aspect of the invention is a display panel having an aluminosilicate glass substrate that is free of alkali metal ions, that has a composition consisting essentially of, as calculated in weight percent on an oxide basis, 40–57% SiO$_2$, 2.0–11% Al$_2$O$_3$, 1–16% CaO, 8–21.5% SrO, 14–31.5% BaO, 0–3% MgO and 0–4% B$_2$O$_3$, the glass having a temperature not over 1450° C. at a viscosity of 20 MPa·s (200 poise), a CTE of 60–90×10$^{-7}$/° C. and a strain point over 630° C.

DESCRIPTION OF THE INVENTION

Figure 1:
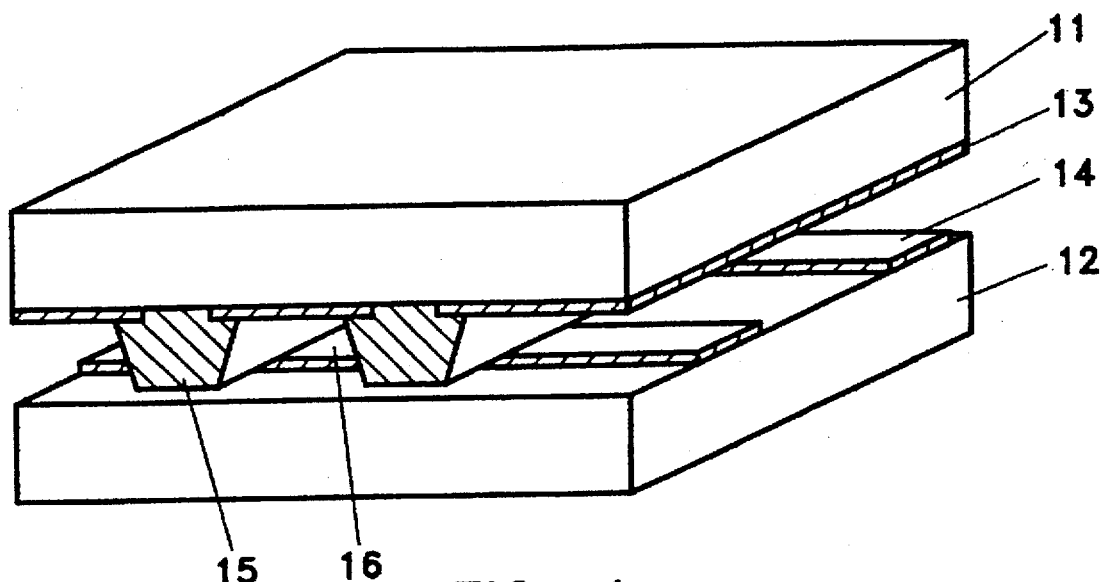
FIG. 1 is a perspective, open view illustrating the basic structure of a plasma display panel.

FIG. 1 in the accompanying drawing is a perspective, open view illustrating the basic structure of a plasma display panel generally designated 10. Panel 10 comprises a front substrate 11 and a back substrate 12. Anode electrodes 13 are formed on the inner surface of front substrate 11, and cathode electrodes 14 are formed on the inner face of back substrate 12. Ribs 15 serve to space substrates 11 and 12, and also to act as isolating barriers. It will be appreciated that isolating barriers may take other known forms as well. In such case, substrates 11 and 12 may be spaced apart by a peripheral sealing strip rather than ribs 15.

Figure 2:
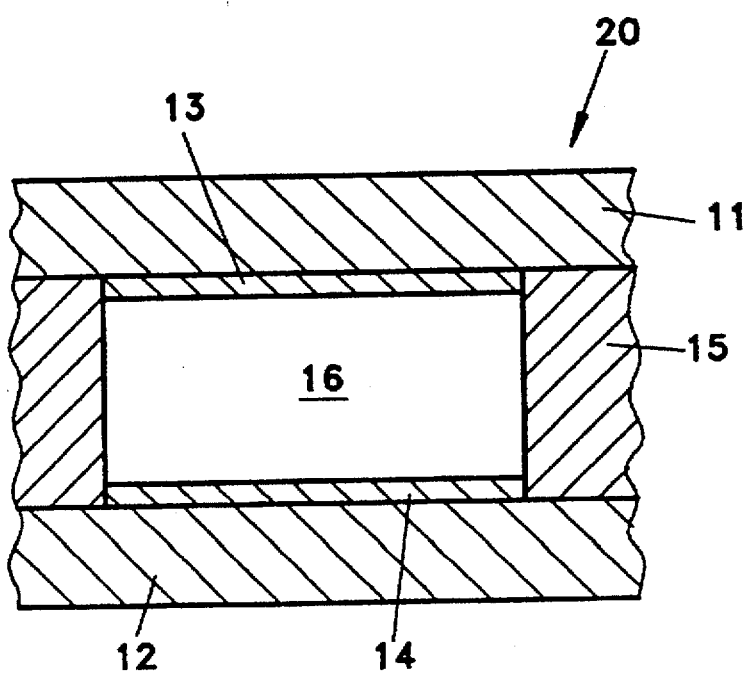
FIG. 2 is a fragmented, side elevation view in cross section of an element in FIG. 1.

FIG. 2 is a fragmented, side elevation view in cross section. It shows, in greatly enlarged form, an element or cell 20 within display panel 10. Substrates 11 and 12 are joined together to form a hermetically enclosed panel. Then the space intermediate the substrates is evacuated and filled with a rare gas in known manner.

The present invention is primarily concerned with improved glasses that are adapted to production of insulating substrates, such as 11 and 12. In particular, the glasses meet the various property requirements of such substrates. In addition, many of the glasses of the present invention are also capable of being formed using the float glass manufacturing process. To provide flexibility in the melting process, and particularly to enable the production of the glasses via the float process, it is desirable that the glass have several characteristics related to melting properties. For example, a melting temperature (i.e., temperature at which the viscosity is about 20 MPa·s (200 poises)) less than or equal to about 1500° C., and more preferably less than or equal to about 1450° C., is desirable in some float processes. More importantly, in order to manufacture the glass via the float glass manufacturing process, it is desirable for the glass to exhibit a viscosity at the liquidus temperature which is greater than 50 MPa·s (500 poises), more preferably greater than 100 Mpa·s (1000 poises), and most preferably greater than about 250 Mpa·s (2500 poises).

The preferred glasses in accordance with the present invention have a CTE in the range of 60–90×10$^{-7}$/° C., more preferably 65–85×10$^{-7}$/° C., and most preferably 79–85×10$^{-7}$/° C. The desire for such a CTE is primarily driven by the desire to match the CTEs of glass frits used in electrodes and sealing operations. The glasses of the present invention preferably have a strain point greater than 630° C., more preferably greater than 645° C., and most preferably greater than about 655° C. A high strain point is desired to help prevent panel distortion due to compaction/shrinkage during subsequent thermal processing. Such processing includes firing of electrodes, sealing of panels and application of coatings. In the most preferred embodiments, the glasses exhibit a combination of desirable CTE's and strain point. For example, the most preferred glasses exhibit a CTE in between 79–85×10$^{-7}$/° C., in combination with a strain point greater than 645° C., and most preferably greater than about 655° C.

In one embodiment of the present invention, alkali metal oxides are essentially avoided other than at levels of under 1.0 weight percent. Glasses having such low alkali metal levels are particularly useful as substrates in direct current (D/C) plasma display panels. However, alkali metals can be utilized in glasses for other embodiments, e.g. plasma displays which are powered by alternating current. On the other hand, it is still desirable that the total alkali level be below about 5 weight percent.

The glass compositions employed herein utilize substantial amounts of the alkaline earth metal oxides BaO, SrO and CaO. BaO, which is the largest of these cations, has the greatest effect in increasing the CTE value, followed by SrO, CaO and MgO, in that order. Up to 3% MgO may be tolerated, but is generally avoided because it may cause phase separation in the glass and because it lowers the CTE excessively. The glasses of the present invention therefore employ 14–31.5% BaO, 8–21.5% SrO, 1–16% CaO and 0–3% MgO, all in weight percent. Preferably, these glasses also employ a total amount of these ingredients (BaO, SrO, MgO, and CaO) in an amount between about 33 and 55 weight percent, more preferably about 35 to 47 weight percent.

Chemical durability of the glasses herein has been determined as weight loss in mg/cm$^2$ that occurs during immersion of a glass sample in 5% HCl solution at 95° C. for 20 minutes. Chemical durability generally improves as the ratio of glass formers plus intermediates to glass modifiers increases. However, it is frequently necessary to effect a compromise between chemical durability and meltability. It is desirable that glasses for present purposes have a weight loss less than about 5.0 mg/cm$^2$, more preferably less than 2.0 mg/cm$^2$ and most preferably less than 1.0 mg/cm$^2$ after exposure to the 5% HCl solution as described above. Glasses having compositions within the following oxide ranges in weight percent are generally characterized by wt. loss values less than 5.0 mg/cm$^2$:

| | |
|---|---|
| SiO$_2$ | 44–57 |
| Al$_2$O$_3$ | 2–12 |
| CaO | 1–15 |
| SrO | 9–19 |
| BaO | 16–29 |
| MgO | 0–3 |
| B$_2$O$_3$ | 0–1 |

The present glasses employ 40–57% by weight SiO$_2$ as the primary glass former. Increasing SiO$_2$ content generally improves durability, but raises the melting point. The glasses also comprise 2.0–11% Al$_2$O$_3$. As the Al$_2$O$_3$ content increases, glass durability increases, but CTE decreases and the melting point increases. Boric oxide (B$_2$O$_3$) decreases melting temperature, but is generally detrimental to durability, strain point, and CTE. Therefore, B$_2$O$_3$ is limited to 4%, more preferably is less than 2% and is most preferably omitted.

The invention is further illustrated by the following examples, which are meant to be illustrative, and not in any way limiting, to the claimed invention. TABLE I sets forth exemplary glass compositions in weight percent, as calculated on an oxide basis from the glass batches. These example glasses were prepared by melting 1000 gram batches of each glass composition at a temperature and time to result in a relatively homogeneous glass composition, e.g. at a temperature of about 1450°–1550° C. for a period of about 6 to 12 hours. Also set forth are relevant glass properties for each glass composition. These include linear coefficients of thermal expansion over the temperature range of 0°–300° C. (CTE×10$^{-7}$/° C.); strain point in ° C.; viscosity at the liquidus (Liq. Visc. MPa·s/poises); temperature at viscosity of 2300 MPa·s in ° C. (Visc. Temp.); melting temperature (Melt. Temp. at 20 MPa·s); weight loss after exposure to 5% HCl solution at 95° C. for 20 minutes (mg/cm$^2$).

TABLE I

| | 1 | 2 | 3 | 4 | 5 | 6 | 7 |
|---|---|---|---|---|---|---|---|
| SiO$_2$ | 47.08 | 48.03 | 48.72 | 52.82 | 47.43 | 46.57 | 46.91 |
| Al$_2$O$_3$ | 7.53 | 5.65 | 4.3 | 8.45 | 8.37 | 8.22 | 8.28 |
| CaO | 6.08 | 6.21 | 6.3 | 8.53 | 4.6 | 4.51 | 4.55 |
| SrO | 12.24 | 12.49 | 12.67 | 13.73 | 12.33 | 13.92 | 12.2 |
| BaO | 27.07 | 27.62 | 28.01 | 16.47 | 27.27 | 26.78 | 26.97 |
| MgO | — | — | — | — | — | — | 1.09 |
| B$_2$O$_3$ | — | — | — | — | — | — | — |
| CTE ×10$^{-7}$/°C. | 73.7 | 75.8 | 76.9 | 66.5 | 72.1 | 72.6 | 72.8 |
| Strain Point (°C.) | 673 | 667 | 660 | 680 | 676 | 675 | 676 |
| Liq. Visc. | 2,800 | 1,900 | 1,500 | 1,600 | 2,000 | 950 | 450 |

TABLE I-continued

|  |  |  |  |  |  |  |  |
|---|---|---|---|---|---|---|---|
| (MPa·s/poises) | 28,000 | 19,000 | 15,000 | 16,000 | 20,000 | 9,500 | 4,500 |
| Visc. Temp. (°C. at 2300 MPa·s) | 1088 | 1075 | 1068 | 1120 | 1105 | 1096 | 1100 |
| Melt Temp. (°C. at 20 MPa·s) | 1373 | 1357 | 1337 | 1413 | 1391 | 1375 | 1376 |
| Wt. Loss | 0.369 | 0.241 | 0.36 | 0.064 | 0.23 | 0.39 | 0.44 |

|  | 8 | 9 | 10 | 11 | 12 | 13 | 14 |
|---|---|---|---|---|---|---|---|
| $SiO_2$ | 43.98 | 47.28 | 56.91 | 48.79 | 53.73 | 47.07 | 46.1 |
| $Al_2O_3$ | 7.03 | 7.56 | 5.02 | 5.74 | 8.59 | 3.46 | 2.71 |
| CaO | 4.26 | 4.58 | 5.52 | 4.73 | 6.95 | 13.69 | 14.85 |
| SrO | 18.4 | 12.29 | 14.8 | 12.69 | 13.97 | 9.85 | 11.92 |
| BaO | 25.29 | 27.18 | 17.75 | 28.05 | 16.75 | 24.98 | 24.45 |
| MgO | 1.02 | 1.1 | — | — | — | — | — |
| $B_2O_3$ | — | — | — | — | — | 0.95 | — |
| CTE ×10$^{-7}$/°C. | 78.3 | 72.3 | 64.7 | 73.5 | 64.6 | 82.0 | 85.0 |
| Strain Point (°C.) | 676 | 673 | 673 | 662 | 682 | 666 | 668 |
| Liq. Visc. (MPa·s/poises) | 120 / 1,200 | 2,200 / 22,000 | 150 / 1,500 | 4,500 / 45,000 | 8,000 / 80,000 | 24 / 240 | 130 / 1,300 |
| Visc. Temp. (°C. at 2300 MPa·s) | 1068 | 1093 | 1137 | 1087 | 1134 | 1023 | 1023 |
| Melt Temp. (°C. at 20 MPa·s) | 1318 | 1369 | 1449 | 1365 | 1451 | 1243 | 1236 |
| Wt. Loss | 4.1 | 0.27 | 0.017 | 0.137 | 0.04 | 3.8 | 4.53 |

|  | 15 | 16 | 17 | 18 | 19 |
|---|---|---|---|---|---|
| $SiO_2$ | 43.8 | 45.1 | 47.0 | 48.4 | 44.8 |
| $Al_2O_3$ | 6.2 | 6.4 | 6.3 | 6.5 | 8.4 |
| $B_2O_3$ | — | — | — | — | — |
| $Na_2O$ | 0.2 | 0.6 | 0.2 | 0.7 | 0.2 |
| $K_2O$ | — | 1.0 | — | 0.9 | — |
| CaO | 8.9 | 8.4 | 8.3 | 7.8 | 8.4 |
| SrO | 16.5 | 15.5 | 15.4 | 14.4 | 15.4 |
| BaO | 24.4 | 23.0 | 22.8 | 21.3 | 22.8 |
| CTE (×10$^{-7}$/°C.) | 84.5 | 85.2 | 82.0 | 81.9 | 78.7 |
| Strain Pt (°C.) | 673 | 654 | 675 | 646 | 678 |
| Liq. Vis. (MPa·s/poises) |  |  | 350 / 3500 |  |  |
| Liquidus (°C.) Temperature | 1195–1205 | 1170–1200 | 1150–1155 | 1145–1170 | 1150–1160 |
| Soft. Pt (°C.) | 882 | 869 | 882 | 873 | 894 |
| Anneal Pt (°C.) | 718 | 700 | 718 | 693 | 723 |

|  | 20 | 21 | 22 | 23 | 24 |
|---|---|---|---|---|---|
| $SiO_2$ | 48.1 | 49.0 | 47.3 | 47.5 | 50.6 |
| $Al_2O_3$ | 9.0 | 9.2 | 8.8 | 8.8 | 11.8 |
| $B_2O_3$ | — | — | 1.0 | 1.5 | — |
| $Na_2O$ | 0.7 | 0.7 | 0.7 | 0.7 | 1.4 |
| $K_2O$ | 1.0 | 1.1 | 1.0 | 1.0 | 2.2 |
| CaO | 11.4 | 13.3 | 8.0 | 7.3 | 10.3 |
| SrO | 12.0 | 10.8 | 13.4 | 13.4 | 9.6 |
| BaO | 17.8 | 15.9 | 19.8 | 19.8 | 14.1 |
| CTE (×10$^{-7}$/°C.) | 79.5 | 78.7 | 77.0 | 77.0 | 74.3 |
| Strain Pt (°C.) | 661 | 664 | 645 | 637 | 645 |
| Liq. Visc. |  |  |  |  |  |
| Liquidus (°C.) Temperature | 1200–1205 | 1220–1240 | 1100–1120 | 1190 | 1125–1100 |
| Soft. Pt (°C.) | 880 | 885 | 866 | 879 | 859 |
| Anneal Pt (°C.) | 708 | 710 | 692 | 684 | 694 |

A glass having a composition and properties as shown in Example 17 is currently regarded as representing the best mode of the invention, that is, as providing the best combination of properties for the purposes of the invention at this time.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A substrate for a flat panel display device wherein said substrate is comprised of a flat, transparent glass exhibiting a linear coefficient of thermal expansion (CTE) over the temperature range 0°–300° C. between $60-90 \times 10^{-7}$/° C. and a strain point over 630° C., said glass consisting essentially of an aluminosilicate having a composition as calculated in weight percent on an oxide basis, of 41–52% $SiO_2$, 2–12% $Al_2O_3$, 4–16% CaO, 8–19% SrO, 16–29% BaO, 0–3% MgO, and 0–4% $B_2O_3$.

2. A substrate glass in accordance with claim 1 which is manufactured by the float process, said glass having a liquidus viscosity greater than about 50 MPa·s (500 poises).

3. A substrate according to claim 2, wherein said glass has a CTE of $79-85 \times 10^{-7}$/° C. and a strain point over 645° C.

4. A substrate according to claim 3, wherein said glass has a strain point over 655° C.

5. A substrate according to claim 1, wherein the $B_2O_3$ content of said glass is less than 1.5 weight percent.

6. A substrate according to claim 5, wherein the MgO content of said glass is less than about 1.5 weight percent.

7. In an emissive flat panel display comprising two glass substrates maintained in an opposed, spaced relationship, the improvement comprising a substrate in accordance with claim 3.

8. A substrate according to claim 5, wherein said glass has less than about 5 percent by weight alkali metal content.

9. A substrate according to claim 6, wherein said glass has less than about 1.0 percent alkali metal content.

10. In a direct current powered emissive flat panel display comprising two glass substrates maintained in an opposed, spaced relationship, the improvement comprising a substrate in accordance with claim 9.

11. A substrate according to claim 1, wherein said glass has a strain point over 655° C.

12. A substrate according to claim 3, wherein the $B_2O_3$ content of said glass is less than about 1.5 weight percent.

13. A substrate according to claim 3, wherein the MgO content of said glass is less than about 1.5 weight percent, and the alkali metal content is less than about 5 percent by weight.

14. A substrate according to claim 1, wherein the glass has a weight loss less than 5.0 mg/cm$^2$ when immersed in 5% HCl at 95° C. for one hour.

15. A glass exhibiting a linear coefficient of thermal expansion (CTE) over the temperature range 0°–300° C. between $60-90 \times 10^{-7}$/° C. and a strain point over 630° C., said glass consisting essentially of an aluminosilicate having a composition as calculated in weight percent on an oxide basis, of 41–52% $SiO_2$, 2–12% $Al_2O_4$, 4–16% CaO, 8–19% SrO, 16–29% BaO, 0–3% MgO, and 0–4% $B_2O_3$.

16. A glass in accordance with claim 15 which is manufactured by the float process, said glass having a liquidus viscosity greater than about 50 MPa·s (500 poises).

17. A glass according to claim 16, wherein said glass has a CTE of $79-85 \times 10^{-7}$/° C. and a strain point over 645° C.

18. A glass according to claim 17, wherein said glass has a strain point over 655° C.

19. A glass according to claim 17, wherein the $B_2O_3$ content of said glass is less than about 1.5 weight percent, and the alkali metal content is less than about 5 percent by weight.

20. A glass according to claim 19, wherein the MgO content of said glass is less than about 1.5 weight percent.

21. A substrate in accordance with claim 1, wherein the glass in essentially free of $B_2O_3$.

22. A substrate in accordance with claim 1, wherein said glass has an alkali content between 1–5 weight percent.

23. A substrate in accordance with claim 21, wherein the glass has an alkali content between about 1 and 5 weight percent.

* * * * *